(12) United States Patent
Simpson

(10) Patent No.: US 9,096,391 B2
(45) Date of Patent: Aug. 4, 2015

(54) ARTICLE DISPENSER APPARATUS

(71) Applicant: Toyota Motor Engineering & Manufacturing North America, Inc., Erlanger, KY (US)

(72) Inventor: Bradley T. Simpson, Rodney (CA)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 87 days.

(21) Appl. No.: 13/693,902

(22) Filed: Dec. 4, 2012

(65) Prior Publication Data

US 2014/0151393 A1 Jun. 5, 2014

(51) Int. Cl.
| | | |
|---|---|---|
| *B65G 59/04* | (2006.01) | |
| *G07F 11/10* | (2006.01) | |
| *B65H 3/16* | (2006.01) | |
| *B65G 47/14* | (2006.01) | |
| *B23P 19/00* | (2006.01) | |

(52) U.S. Cl.
CPC ........... *B65G 47/1485* (2013.01); *B23P 19/001* (2013.01); *B23P 19/004* (2013.01)

(58) Field of Classification Search
CPC .. B65G 47/244; B65G 11/123; B65G 11/126; B65G 29/00; B43M 99/009; G07F 11/045; G07F 11/44; G07F 11/54; G07F 11/16; A63B 57/0006; A63B 57/0018; A63B 47/002
USPC .......... 206/340, 531, 538, 534; 221/212, 155, 221/48, 1; 198/33; 473/137
See application file for complete search history.

(56) References Cited

U.S. PATENT DOCUMENTS

| | | | | |
|---|---|---|---|---|
| 2,206,147 | A * | 7/1940 | Zimmermann | 379/36 |
| 3,054,170 | A * | 9/1962 | Benichasa et al. | 29/810 |
| 3,065,841 | A * | 11/1962 | Stover | 198/392 |
| 3,275,136 | A * | 9/1966 | Allen et al. | 209/562 |
| 3,380,586 | A * | 4/1968 | Frobese et al. | 209/562 |
| 3,448,894 | A * | 6/1969 | Modrey et al. | 221/160 |
| 3,637,065 | A * | 1/1972 | Ruscitti | 198/396 |
| 3,674,141 | A * | 7/1972 | Abraham et al. | 209/644 |
| 3,863,802 | A * | 2/1975 | Daniels | 221/68 |
| 4,061,094 | A * | 12/1977 | Cary et al. | 111/89 |
| 4,095,723 | A * | 6/1978 | Lerner | 222/56 |
| 4,300,462 | A * | 11/1981 | Wilkins et al. | 111/91 |
| 4,453,575 | A | 6/1984 | Del Rosso | |
| 5,076,091 | A * | 12/1991 | Sartorio | 72/422 |
| 5,078,083 | A * | 1/1992 | DiMaio et al. | 118/308 |
| 5,078,300 | A * | 1/1992 | Heu | 221/212 |
| 5,096,091 | A * | 3/1992 | Heu | 221/212 |
| 5,389,190 | A * | 2/1995 | Larsen et al. | 156/521 |
| 5,389,490 | A * | 2/1995 | Tomita et al. | 430/138 |
| 5,391,036 | A * | 2/1995 | Bauer et al. | 414/223.02 |
| 5,529,208 | A * | 6/1996 | Carstens et al. | 221/155 |
| 6,328,659 | B1 * | 12/2001 | Peterson | 473/137 |
| 6,419,589 | B1 * | 7/2002 | Carter | 473/134 |

(Continued)

*Primary Examiner* — Rakesh Kumar
(74) *Attorney, Agent, or Firm* — Christopher G. Darrow; Darrow Mustafa PC

(57) ABSTRACT

An article dispenser accumulates and dispenses a required correct number of articles from a supply of loose articles to complete a work operation. The articles are picked one at a time from the supply of articles and deposited on a pivotal chute for collection in a ladle at an outlet of the chute. When the correct number of articles are deposited in the chute, the chute pivots from a first article accumulation position to a second position allowing removal of the articles from the ladle.

11 Claims, 6 Drawing Sheets

(56) References Cited

U.S. PATENT DOCUMENTS

| | | |
|---|---|---|
| 6,786,358 B1 * | 9/2004 | Suzuki .......................... 221/212 |
| 7,166,034 B2 * | 1/2007 | Hines et al. ................... 473/137 |
| 7,963,854 B2 * | 6/2011 | Nugent et al. ................. 473/137 |
| 8,191,731 B2 * | 6/2012 | Ota ................................ 221/254 |
| 8,479,671 B2 * | 7/2013 | Shoup ........................... 111/185 |
| 2012/0090956 A1 * | 4/2012 | Brobst .......................... 198/525 |

* cited by examiner

ARTICLE DISPENSER APPARATUS

BACKGROUND

The description relates, in general, to article dispenser apparatus and, more particularly, article dispensing apparatus for dispensing a correct number of articles for a work operation.

Article dispensing apparatus are known for dispensing articles one at a time or in bulk into a container for shipment to a use site. Large size, vibrating feed dispensers are known for dispensing articles, individually, into a large container.

Such article dispensing apparatus weigh the large container to determine, by weight, the number of articles which have been dispensed into the container. However, such vibrating feed article dispensing apparatus are large, making them unsuitable for use in a manufacturing assembly line and, in particular, an automotive vehicle assembly line where space adjacent to the assembly line is limited.

In vehicle assembly operations, an operator in a work station may be required to install one or more fasteners, such as bolts, nuts, screws, clips, etc. on a vehicle body currently located in a work station. The worker will have a large container of such fasteners located adjacent to the workstation. For each work operation, the worker will remove the correct number of fasteners from the container located adjacent to the assembly line; move to the vehicle body, and then install the fasteners in the vehicle body. However, frequently the worker picks up fewer or more than the correct number of fasteners required for the particular work operation. It is also common for the worker to occasionally drop one or more fasteners as he moves from the location of the fastener container to the vehicle body as well as while installing the fasteners one at a time onto the vehicle body.

If the worker initially picks up fewer than the required number of fasteners or drops one or more fasteners during the work operation, he must return to the article container and pick up the required number of fasteners from the container. Even though the worker only walks a few feet between the vehicle body and the article container, it takes time which reduces the efficiency of the vehicle assembly operation as well as causing the worker to expend additional energy to complete the work operation leading to fatigue.

Further, each time the worker inserts his fingers into the article container to pick up the required number of articles, his fingers jam into the articles which leads to long term desensitizing of the worker's fingers. Each time the worker picks up an original article quantity less than that required for the work operation, the worker must reinsert his fingers into the article container again, thereby increasing the effects of long term desensitizing of the worker's fingers.

It would be desirable to provide an article dispensing apparatus for use in manufacturing operations which is portable, small, and which is capable of dispensing only the required number of articles for a particular work operation.

SUMMARY

An article dispenser includes a housing with an opening for receiving a plurality of loose articles, a rotary member in communication with an interior of the housing, a chute pivotally mounted on the housing and having an inlet and an outlet and at least one magnet carried on the rotary member for a magnetically attracting and carrying one article at a time from a plurality of loose articles in the interior of the housing to the inlet of the chute. The article dispenser includes a slide mounted in the interior of the housing for directing the loose articles from the opening toward the rotary member.

An article receiving ladle is carried on the outlet of the chute. A counter weight is mounted adjacent the inlet of the chute to provide a counter balance for the chute to enable the outlet of the chute to pivot from a first position when the ladle is empty of articles to a second spaced position when a correct number of articles are deposited in the ladle.

A pivot point of the chute is disposed intermediate the inlet and outlet of the chute.

The removal of the articles from the ladle allows the counter weight to pivot the outlet of the chute to the first position.

The article dispenser includes a sensor detecting movement of the chute to the second position. An output of the sensor deactivates movement of the rotary member. A different output of the sensor, when the outlet end of the chute has been pivoted to the first position, reinstitutes rotary motion of the rotary member.

The article dispenser includes an electric motor drive coupled to the rotary member of rotating the rotary member, the sensor output coupled between a source of electric power and the electric motor for activating and deactivating the electric motor.

he article dispenser includes article eliminator mounted in the housing, and positioned to disengage a second article carried by the magnet from the magnet to limit the number of articles carried by the magnet to the inlet of the chute to a single article at a time.

BRIEF DESCRIPTION OF THE DRAWING

The various features, advantages and other uses of the present article dispenser apparatus will become more apparent by referring to the following detailed description and drawing in which.

DETAILED DESCRIPTION

Referring now to FIGS. 1-4, there is depicted an article dispenser 10 configured for dispensing articles, particularly small articles, such as fasteners, i.e., nuts, bolts, screws, clips, etc.

The article dispenser 10 is configured for dispensing a predetermined or a correct number of articles that are required by a worker to complete a work operation.

For example, the following description of the use of the article dispenser 10 will be in an automobile assembly plant where a worker in a work station performs a work operation which may entail the installation of one or more articles, such as nuts, bolts, screws, clips or other fasteners, on a vehicle body currently located in the work station. In performing the work operation, the worker picks up the required number, hereafter also referred to as the "correct number", of articles from an article container located in a process or work station dolly adjacent to the assembly line which contains a large number of such articles, typically hundreds of nuts, screws, bolts, etc. The worker, after he or she has picked up correct number of articles from the article container or parts bin, then walks over to the vehicle body on the assembly line and installs the articles in their proper location on the vehicle body.

Figure 5:
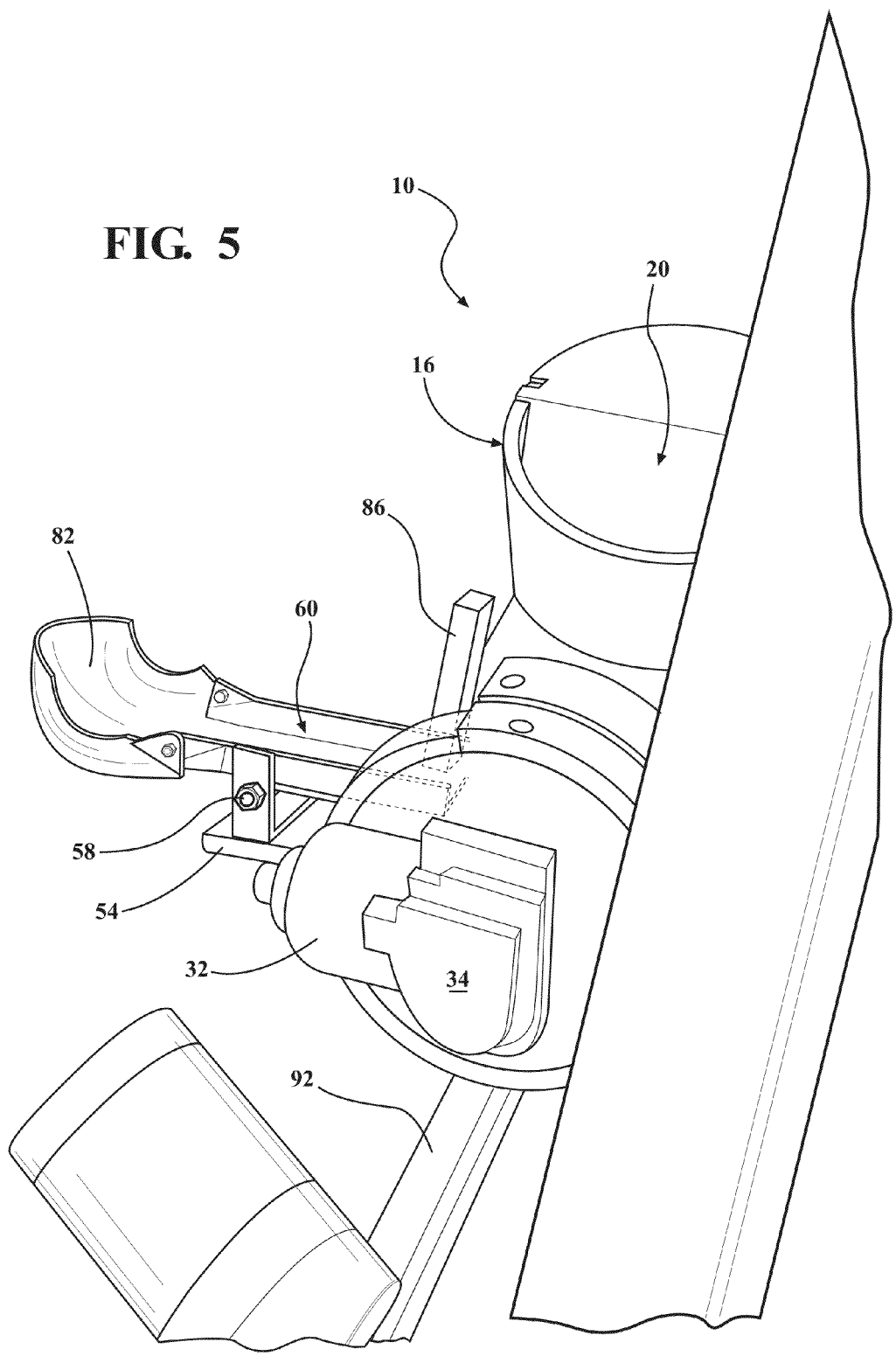
FIG. 5 is a perspective view of a work station employing the article dispenser shown in FIGS. 1-4, where the article dispenser is deployed in an empty position.
Figure 6:
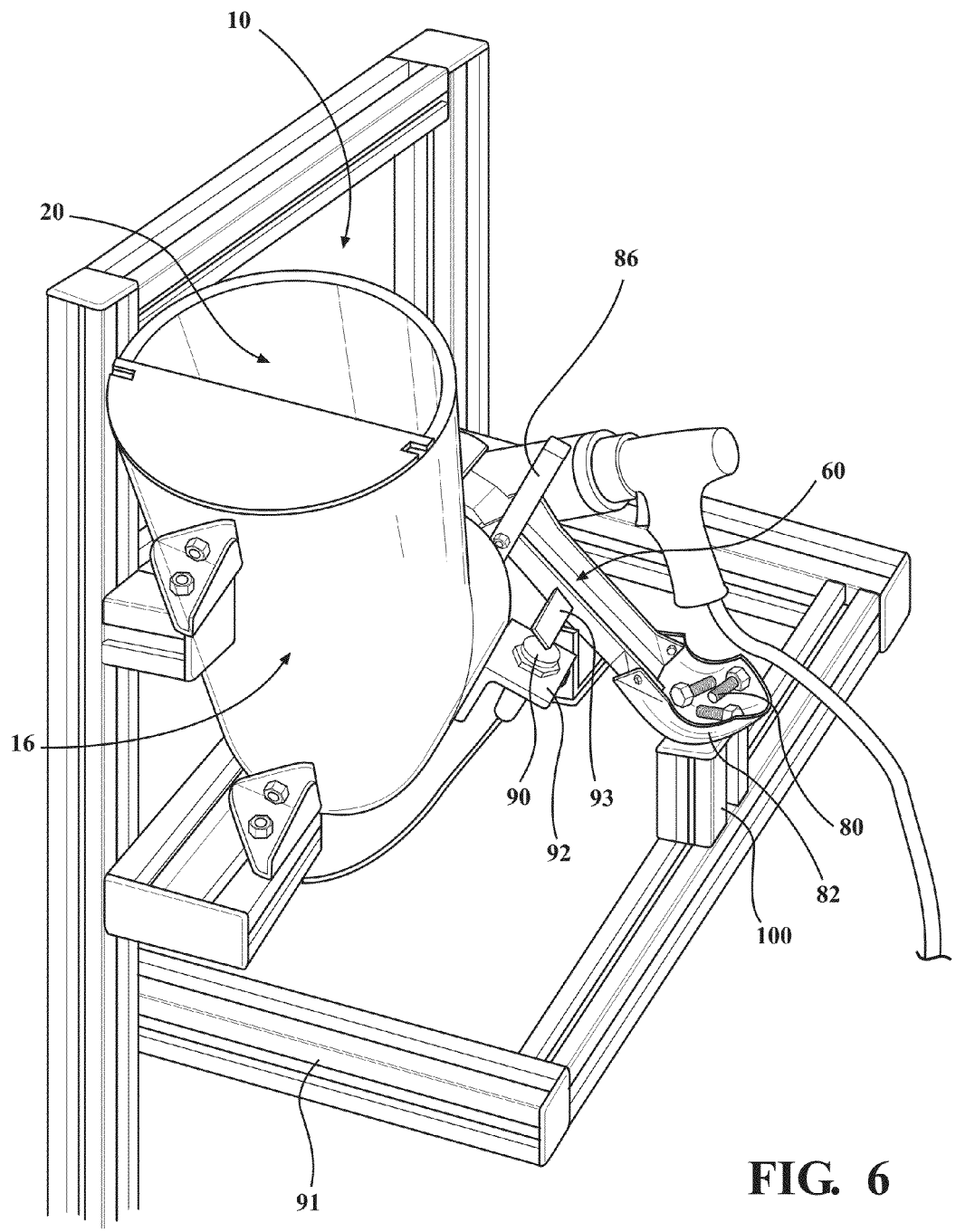
FIG. 6 is a perspective view of a station with the article dispenser shown in its article dispensing position presenting the articles for pick up by a worker.

The article dispenser 10 includes a housing 12 having a first longitudinally extending housing portion 14 having a cylindrical shape and an angularly upward disposed end portion 16. The term "upward" is taken with respect to the orientation of the end portion 16 in a use position, as shown in FIGS. 5 and 6.

The housing 12, including the longitudinal housing portion 14 and the angled end portion 16, is hollow with the interior of the longitudinal portion 14 and the interior of the end portion 16 in communication with each other.

The housing 12 may be formed of any suitable material, such as metal, plastic, etc. Cylindrical PVC pipe is shown as the material used to construct the housing 12, by example.

Figure 4:
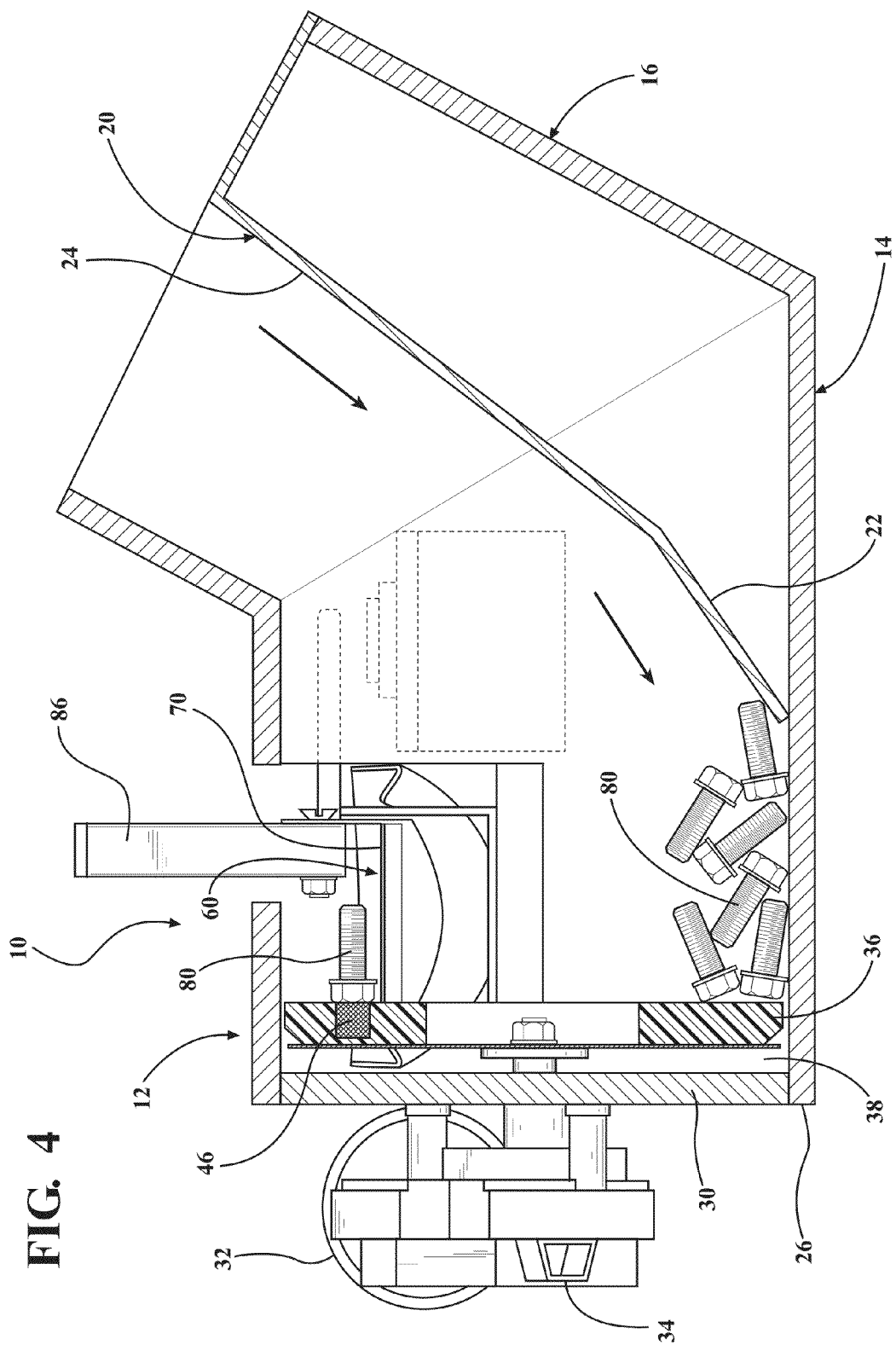
FIG. 4 is a cross sectional view of the article dispenser generally taken along line 4-4 in FIG. 1.

An angled surface or slide 20 is formed within the end portion 16 of the housing 12. The slide 20 can be in the form of a thin plate with end flanges secured to the interior of the end portion 16 of the housing 12 by adhesive or fasteners, such as screws, etc. As shown in FIG. 4, the lower end portion 22 of the slide 20 which is situated primarily within the longitudinal housing portion 14 is angled from the main extent 24 of the slide 20 to direct the loose articles, described hereafter as bolts, for example, into the bottom of the longitudinal housing portion 14 in a direction to move the articles or bolts toward an end 26 of the longitudinal housing portion 14.

A motor mounting plate 30 is mounted at the end 26 of the housing 12. The motor mounting plate 30, which can be made of steel, is fixed in the end 26 of the longitudinal housing portion 14 of the housing 12 by adhesive, fasteners, etc. The motor mounting plate 30 supports a rotary drive source, such as an electric motor 32, having its output shaft connected through a gear box or transmission 34 to drive a shaft, not shown, coupled to a rotatable non-metallic or non-magnetic disc 36 which is attached by fasteners to a steel backing plate 38. The backing plate 38 is rotatably sandwiched between the fixed motor mounting plate 30 and the rotatable disc 36 and rotates with the rotatable disc 36.

Figure 1:
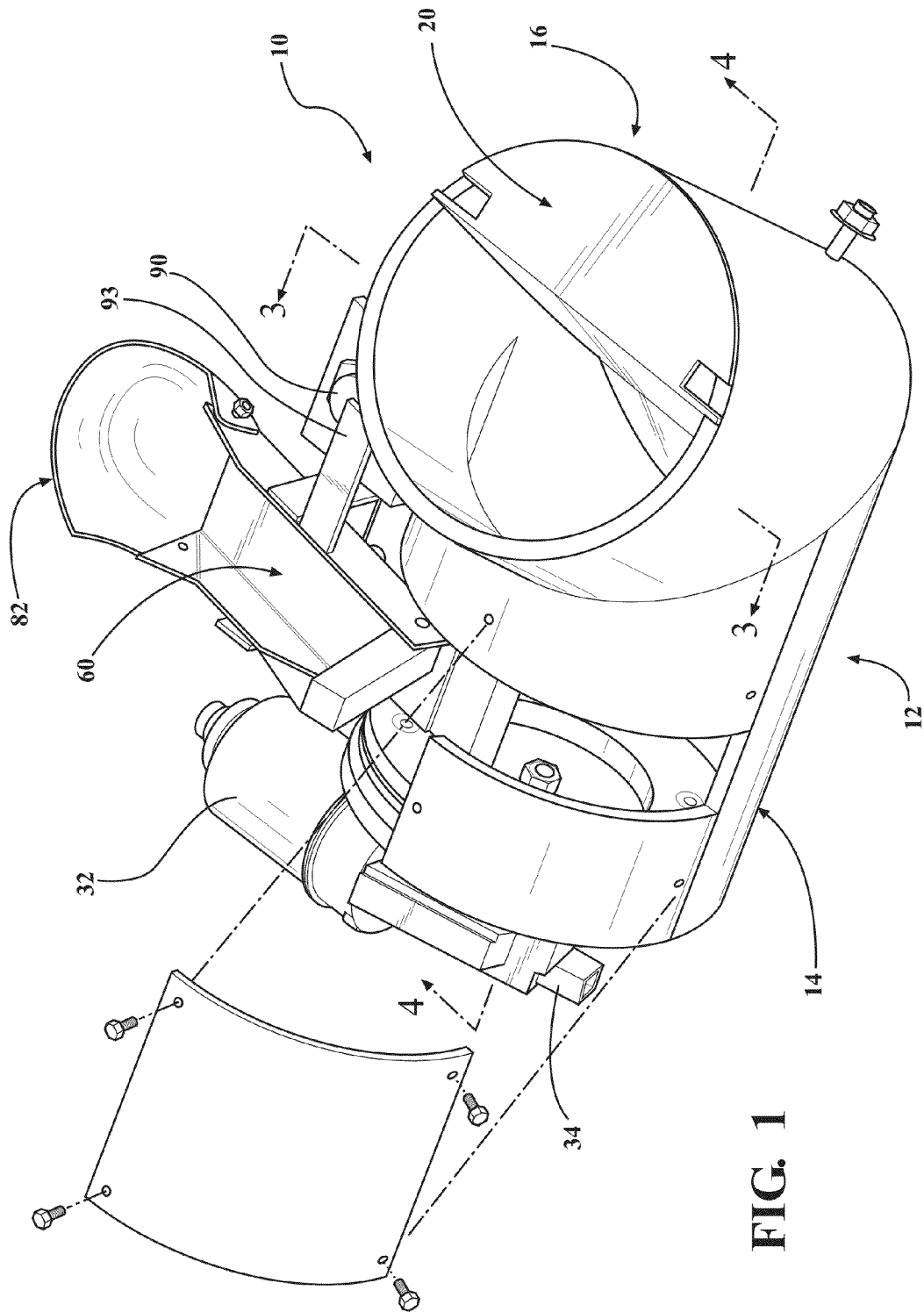
FIG. 1 is a perspective view of one end of an article dispenser.
Figure 2:
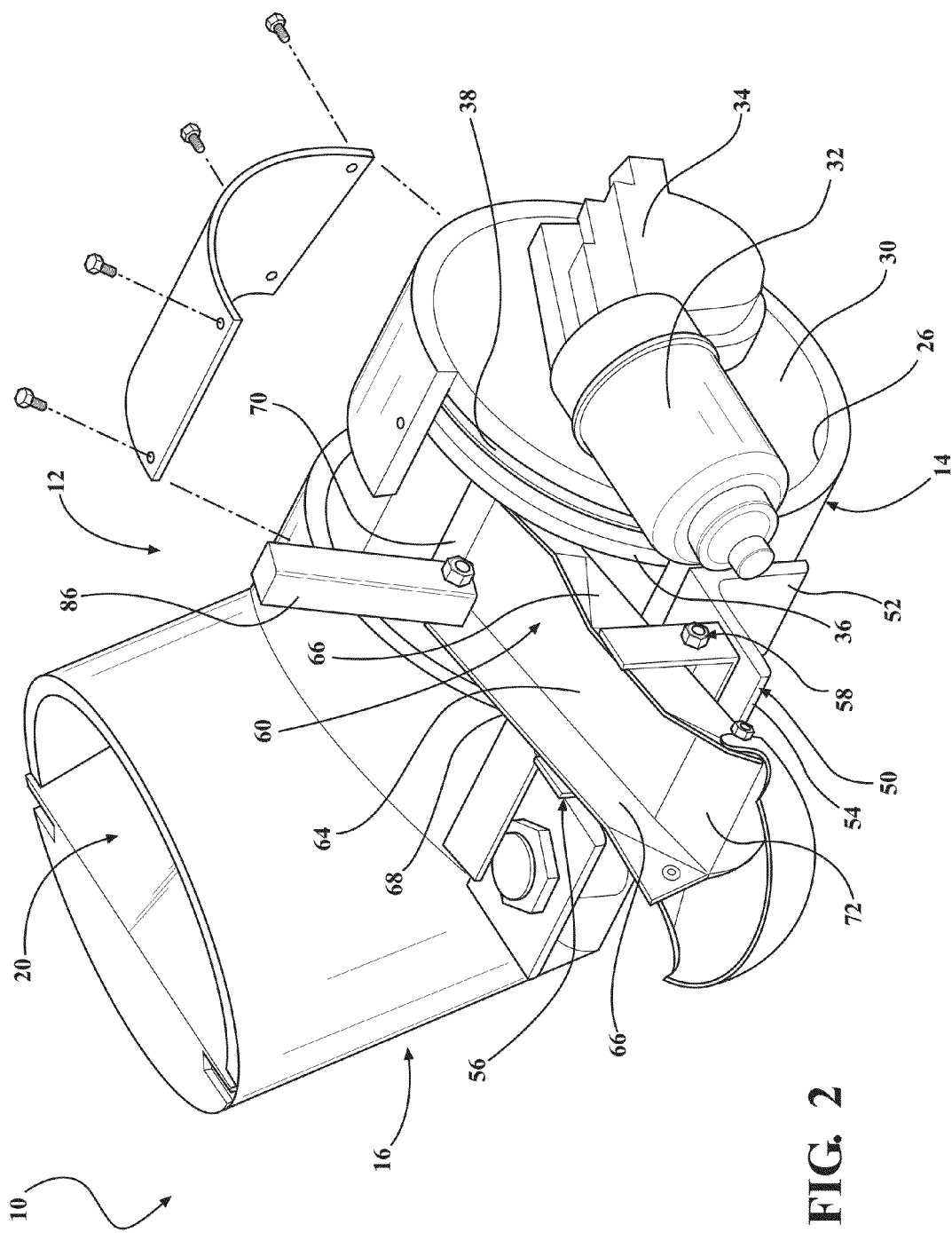
FIG. 2 is a perspective view of the opposite end of the article dispenser.
Figure 3:
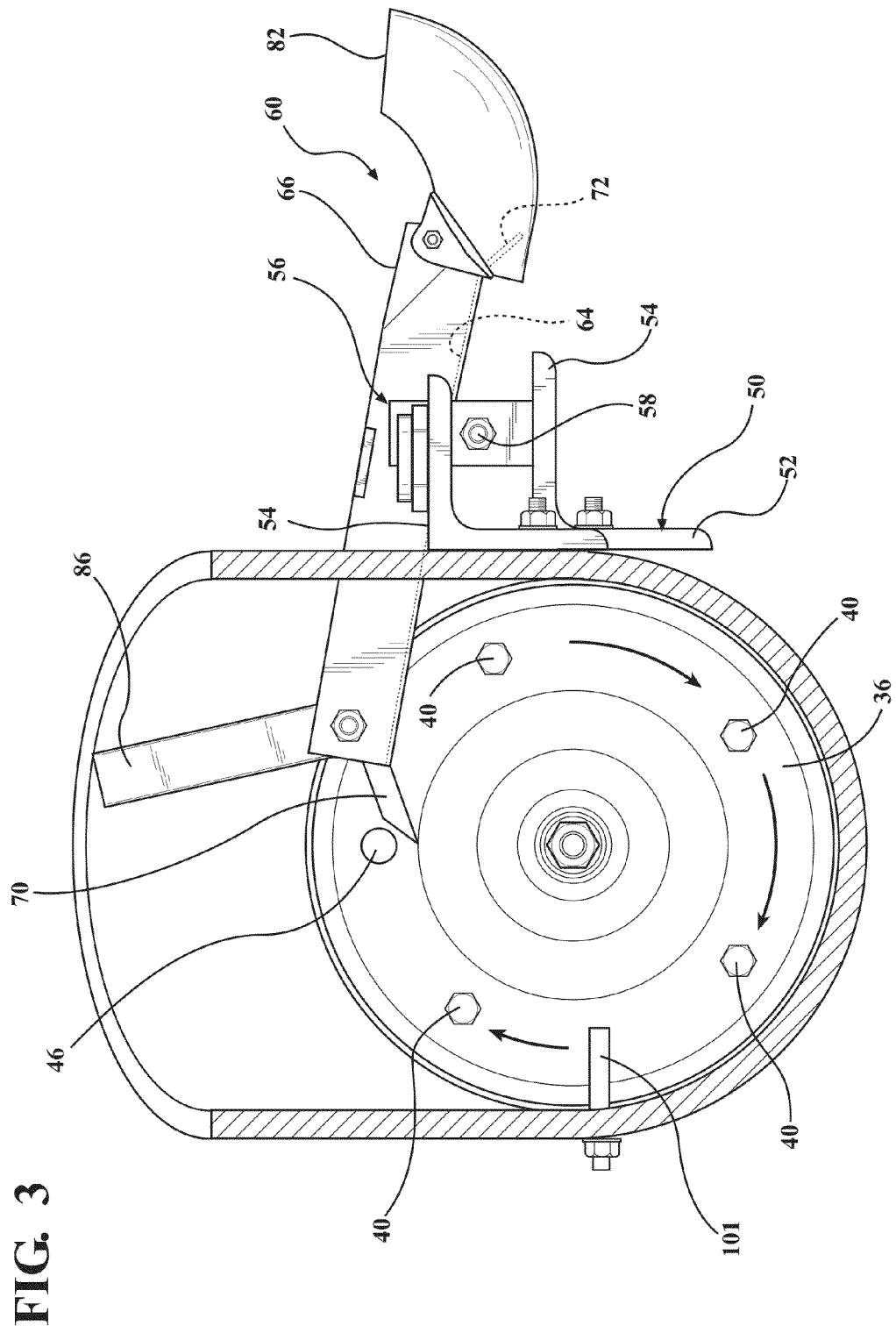
FIG. 3 is a cross sectional view of the article dispenser, generally taken along line 3-3 in FIG. 1.

As shown in FIG. 3, a plurality of fasteners 40 couple the rotary disc 36 to the backing plate 38. At least one magnet 46 is embedded in or carried on the rotary disc 36, with the front face of the magnet 46 lying flush with the surface of the disc 36, by example.

A shelf 50, which can be in the form of an angle bracket having a first vertically extending leg 52 and a second horizontally extending leg 54, is fixed to the side of the longitudinal housing portion 14 of the housing 12 by fasteners. The second horizontally extending leg 54, supports a pivot assembly in the form of a U-shaped member 56 fixed to the second horizontal leg 54 of the shelf 50. A pivot pin 58 extends through the spaced legs of the u-shaped member 56 and a flanged bracket mounted on the bottom portion of a chute 60 intermediate the ends of the chute 60. The chute 60 is in the form of a channel like tray formed of a bottom wall 64 and opposed upstanding side walls 66 and 68. A first lip 70 extends at a small downward angle from one end of the bottom wall 64. A similar downward extending second lip 72 extends from the opposite end of the bottom wall 64 of the chute 60. The first lip 70 is positioned to separate a fastener, such as a bolt 80 shown by way of example in FIG. 3 picked up by the magnet 46, from the accumulation of loose bolts 80 in the bottom portion of the interior of the housing 12 from the magnet 46. The fastener or bolt 80 slides downward along the bottom wall 64 of the chute 60 and is directed by the second lip 72 into a collection tray or ladle 82. The ladle 82 has an open top cuplike shape for accumulating the correct number of fasteners for a particular work operation as well as allowing easy access by the worker's hand to pick up all of the elected fasteners from the ladle 82.

A counter weight 86, in the form of a metal bar is fixed to the end of the chute 60 adjacent the first lip 70. The weight of the counter weight 86 is selected in combination with the required number and weight of the fasteners which are accumulated in the ladle 82 for removal by a worker to complete a work operation. In addition, the lever arm between the pivot pin 58 and the counter weight 86 and the lever arm between the pivot pin 58 and the bottom of the ladle 82 are taken into account so that the counter weight 86 is capable of pivoting the chute 60 to an upper position shown in FIG. 3 when one or more of the fasteners have been removed from the ladle 82. This upper or first position represents the article accumulation position of the chute 60.

Further, only when the correct number of articles deposited in the ladle 82, will the weight of the articles in the ladle 82 overcome the counter weight 86 and cause the ladle 82 end of the chute 60 to pivot to a lower or second position shown in FIG. 6. This lower or second position represents the worker access position where the worker can reach in and remove the articles from the ladle 82.

When the ladle 82 end of the chute 60 reaches the second position shown in FIG. 6, the ladle 82 contacts a stopper 100 mounted on a work station support 91 to prevent further downward pivotal movement of the ladle end of the chute 60.

A sensor 90 is mounted on a support surface 92 attached to the housing 12 and is engaged by a flange 93 affixed to and extending outward from one sidewall 68 of the chute 60. An output from the sensor 90 is coupled in series with the source of electric power supplied to the motor 32 to deactivate the motor 32 and stop rotation of the rotary disc 36. The end of rotation of the disc 36 ceases the accumulation of new articles in the ladle 82.

After all of the articles have been removed from the ladle 82 and the counter weight 86 causes the ladle end of the chute 60 to pivot upward to the first position shown in FIG. 3, the separation of the flange 93 from the sensor or proximity switch 90 enables the output of the sensor 90 to cause the reapplication of electric power to the motor 32. The output shaft of the motor 32, when rotating, causes rotation of the disc 36 in the direction of the arrows shown in FIG. 3. This rotates the magnet 46 in a clockwise direction, in the orientation of FIG. 3, which will eventually move the magnet 46 through the accumulation of fasteners in the bottom of the longitudinal housing portion 14 of the housing 12. One of the articles, such as one bolt 80, will be magnetically attracted to the magnet 46 and be carried by the magnet 46 in the direction of the arrows in FIG. 3 upward until the bolt 80 engages the first lip 70 on the chute 60 which separates the bolt 80 from the magnet 46 and allows the bolt 80 to slide down the chute 60 and into the ladle 82.

If more than one bolt 80 is magnetically affixed to the magnet 46, an article limiter 101, in the form of a pin fixed to the housing 12 and extending inward in front of the rotary disc 36 will strip off the additional bolt or bolts 80 which may be affixed to the magnet 46 so that only bolt 80 is carried by the magnet 46 from the bottom of the housing 12 up to the chute 60.

This process of picking up and depositing one article or bolt 80 at a time into the chute 60 continues until the correct numbers of articles have been deposited into the ladle 82 at the end of the chute 60. The accumulated total weight of the proper or correct number of articles in the ladle 82 overcomes the weight of the counter weight 86 and causes the ladle 82 end of the chute 60 to pivot from the first position to the second position. When the ladle 82 end of the chute 60 reaches the second position shown in FIG. 6, the flange 93 will again engage the sensor or proximity switch 90 causing the output from the sensor 90 to deactivate the motor 32 and stop the accumulation of additional articles in the ladle 82.

In the event that the operator drops one of the articles that he or she picked up from the ladle 82 before the article or bolt 80 can be used in the work operation, the worker can manually lower the ladle end of the chute 60 from the first empty ladle position to the second lower position. As the chute 60 has already pivoted upward to the first position and after all of the articles 80 have been removed from the ladle 82, the article dispenser 10 will begin accumulation of additional articles 80 in the ladle 82. Thus, the worker can remove the additional number of articles 80 he requires from the ladle 82 when the ladle 82 is in the first upward position or after the operator manually lowers the ladle 82 and the chute 60 to the second lower position. After removal of one or more articles 80, the counterweight 86 pivots the article dispenser 10 back to to the first position and its normal operation resumes. The magnet 46 will then pick up articles from the interior of the housing 12 until the proper or correct numbers of articles are again deposited in the ladle 82.

Electric power can be supplied to the motor 32 from a plug in building power connection, a hardwire connection, or by other suitable means. Alternately, the power to the motor 32 can be supplied by rechargeable batteries mounted on the work station dolly or platform to provide a measure of portability to the article dispenser 10.

In a typical automotive assembly line operation, a particular vehicle body will be present within a particular work station for a given amount of time depending upon the line speed. Therefore, depending upon the total amount of time available for a single work cycle or work operation and the number of articles, such as the bolts 80, which are required to complete a single work operation, two or more magnets 46 may be mounted in the rotary disc 36 to double the rate that the proper or correct number of articles are accumulated and deposited in the ladle 82.

For example, in the above example of three fasteners constituting the proper or correct number of fasteners for a single work operation, coupled with a work cycle time of at least one minute, a single magnet 46 can be sufficient to accumulate the proper or correct number of three articles and still give the operator a sufficient amount of time during the remainder of the work cycle to complete the work operation.

However, even with the same one minute work cycle period, a work operation requiring many more fasteners, such as ten fasteners, may require two or three or even more magnets 46 on the disc 36 to accumulate the fasteners at a faster rate in the ladle 82. This is a necessity since the large number of articles or fasteners that the worker has to install during a single work cycle is much greater than the three fasteners described in the prior example, and more time is necessary for the worker to install all of the fasteners on the vehicle.

The article dispenser 10 reduces operator motions during work operation for a process efficiency improvement. The article dispenser 10 also reduces impact to the operator's fingers and hands thereby minimizing long term desensitizing of the worker's finger. The article dispenser 10 also reduces articles or hardware dropped on the floor due to the worker picking up a greater quantity of articles than the vehicle requires for a single work operation or if the worker drops one or more articles before they can be installed on the vehicle. Finally, the article dispenser 10 reduces process fluctuation from cycle to cycle due to the worker having to go back to the process dolly when the original article pick quantity was less than that required for the work operation on a vehicle.

What is claimed is:

1. An article dispenser comprising:
   a housing with an opening for receiving a plurality of loose articles;
   a rotary member disposed in communication with an interior of the housing;
   a chute pivotally mounted at a pivot point and having an inlet end and an outlet end;
   at least one magnet carried on the rotary member disposed in communication with an interior of the housing for magnetically attracting and carrying one article from a plurality of articles in the interior of the housing to the inlet of the chute;
   an article receiving ladle carried on the outlet of the chute;
   a counter weight mounted adjacent the inlet of the chute to provide a counter balance for the chute to enable the chute to pivot the outlet of the chute from a first position when the ladle is empty of articles and a second spaced position when a correct number of a plurality of articles are deposited in the ladle; and
   a sensor detecting movement of the chute to the second position, an output of the sensor deactivating rotation of the rotary member, the output of the sensor, when the outlet of the chute has been pivoted to the first position, reinstituting rotation of the rotary member.

2. The article dispenser of claim 1 further comprising:
   the pivot point of the chute disposed intermediate the inlet and outlet of the chute.

3. The article dispenser of claim 1 wherein:
   removal of the articles from the ladle allows the counter weight to pivot the outlet of the chute to the first position.

4. The article dispenser of claim 1 further comprising:
   an article limiter mounted in the housing, and positioned to disengage a second article carried by the magnet from the magnet to limit the number of articles carried by the magnet to the inlet of the chute to a single article.

5. The article dispenser of claim 1 further comprising:
   an electric motor coupled to the rotary member of rotating the rotary member; and
   the output of the sensor coupled between a source of electric power and the electric motor for activating and deactivating the electric motor.

6. The article dispenser of claim 1 further comprising:
   a slide mounted in the interior of the housing for directing the loose articles from the opening toward the rotary member.

7. An article dispenser comprising:
   a housing with an opening for receiving a plurality of loose articles;
   a rotary member disposed in communication with an interior of the housing;
   a chute pivotally mounted at a pivot point and having an inlet end and an outlet end;
   at least one magnet carried on the rotary member disposed in communication with an interior of the housing for magnetically attracting and carrying one article from a plurality of articles in the interior of the housing to the inlet of the chute;
   an article receiving ladle carried on the outlet of the chute;

a counter weight mounted adjacent the inlet of the chute to provide a counter balance for the chute to enable the chute to pivot the outlet of the chute from a first position when the ladle is empty of articles and a second spaced position when a correct number of a plurality of articles are deposited in the ladle;

an electric motor coupled to the rotary member for rotating the rotary member; and a sensor disposed to detect the chute in the second position, coupled to a source of electric power and the electric motor for activating the electric motor to rotate the rotary member in response to the chute in the first position and the second position.

8. The article dispenser of claim 7 wherein:

the counter weight, after the articles have been removed from the ladle, pivots the outlet of the chute to the first position.

9. The article dispenser of claim 7 further comprising:

a slide mounted in the interior of the housing for directing the loose articles from the opening toward the rotary member.

10. The article dispenser of claim 7 further comprising:

an article limiter mounted in the housing, and positioned to disengage a second article carried by the magnet from the magnet to limit the number of articles carried by the magnet to the inlet of the chute to a single article.

11. The article dispenser of claim 7 further comprising:

at least one rechargeable battery to power the electric motor.

* * * * *